United States Patent Office 3,669,516
Patented June 13, 1972

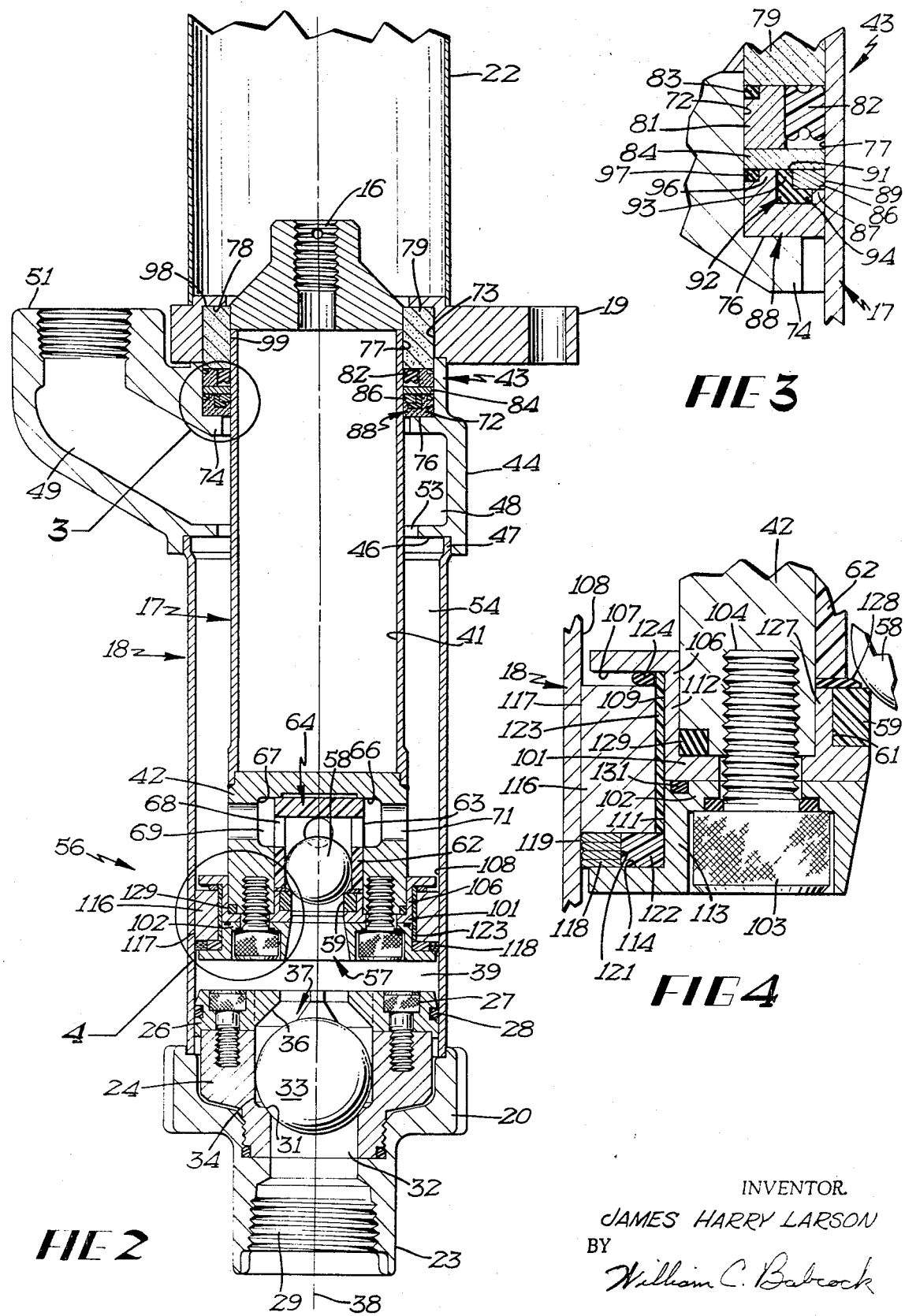

3,669,516
PUMP
James H. Larson, Anoka, Minn., assignor to
Graco Inc., Minneapolis, Minn.
Filed Mar. 4, 1970, Ser. No. 16,376
Int. Cl. F16c 33/74
U.S. Cl. 308—36.1                                  11 Claims

ABSTRACT OF THE DISCLOSURE

A pump for fluid slurry materials is provided with bearing and sealing portions and with one-way valve constructions which permit the pumping of slurry materials and prevent such materials from penetrating bearings, seals and valves in such a way as to cause binding or other problems in the operation of such parts. The bearing and sealing construction includes a plurality of annular members which essentially completely fill a specified critical area or space within an annular bearing and sealing section located between relatively movable inner and outer cylindrical surfaces. Each such section includes a radially resilient scraper member, which has a scraping edge resiliently engaging one of the cylindrical surfaces and an opposite edge spaced from the other cylindrical surface. The scraper member is supported and guided immediately adjacent its scraping edge by two relatively rigid annular members or bearing wall portions, one on each side of the scraping edge. A resiliently compressed annular filler member of expansible material, such as rubber, is located immediately adjacent the opposite edge of the scraper member and thus prevents slurry material from penetrating into the space between said opposite edge and the remaining cylindrical surface. In one form, the bearing and sealing section also includes one or more ceramic or other hard nonmetallic annular bearing or gland members.

The one-way valves in the pump include metallic valve ball members supported in sliding engagement with nonmetallic plastic or ceramic guiding portions and valve seats.

BACKGROUND AND SUMMARY

Prior art pumps have been proposed for the pumping of fluid slurry materials. Such pumps have often been unsatisfactory or impractical because they must either be manufactured with exceedingly close and costly tolerances to prevent undesired leakage or penetration of the slurry material, or because such prior constructions permitted penetration of such materials into such critical areas as the space within the bearing and sealing sections, where the build-up of material ultimately caused binding of the parts and extreme wear of the sealing or valve members.

The slurry pumps of the present invention provide bearing and sealing sections and valve constructions in which metal-to-metal contacts between relatively sliding parts are minimized, and in which a relatively tight seal may be attained with the utilization of a resilient metallic scraper member, supported at its scraping edge between relatively hard and smooth annular members at wall portions which permit radial flexing of the scraper but prevent undesired axial shifting or tilting of its scraping edge. The space behind the opposite edge of such a scraper member, which is necessary to permit its resilient engagement with the surface to be scraped, is effectively sealed against the penetration of slurry material by a resilient expansible filler member which is under compression and in effect fills the space immediately adjacent the edge of the scraper member which is opposite to its scraping edge. In a preferred form of the invention, such a scraper member and resilient filler member are used together in a bearing and sealing assembly which also includes a ceramic or graphite bearing member providing the primary bearing support for relative movement of the parts, while the scraping edge maintains the desired slurry-sealing engagement between such parts.

These bearing and scraper members are located in an annular bearing and sealing section between inner and outer coaxial cylindrical surfaces. The axial ends of the section are defined and partially closed by rigid end walls, between which that portion of the annular section extending along and immediately adjacent one of said surfaces is substantially completely filled by a plurality of annular members which include at least one resilient annular filler member. Such annular member is resiliently expansible and is under sufficient compression to prevent substantial penetration of slurry materials radially adjacent or behind the scraper member. The various annular members may thus be produced with reasonable or liberal manufacturing tolerances, rather than close precision fits. Any critical gaps adjacent the scraper member which might otherwise result from an assembly of annular members having a cumulative dimension smaller than the length or depth of the annular bearing space would be closed or eliminated by the presence of such a resiliently compressed expansible member.

BRIEF DESCRIPTION OF DRAWINGS

In the drawings which form a part of this application, and in which like reference characters indicate like parts.

FIG. 2 is a sectional view, taken on the line 2—2 of FIG. 1, through the central longitudinal axis of the improved slurry pump according to the present invention.

FIG. 3 is an enlarged partial sectional view of part of one bearing and sealing section, marked by circle 3 of FIG. 2.

FIG. 4 is an enlarged partial sectional view of part of another bearing and sealing section, marked by circle 4 of FIG. 2.

DESCRIPTION OF PREFERRED EMBODIMENTS

Figure 1:
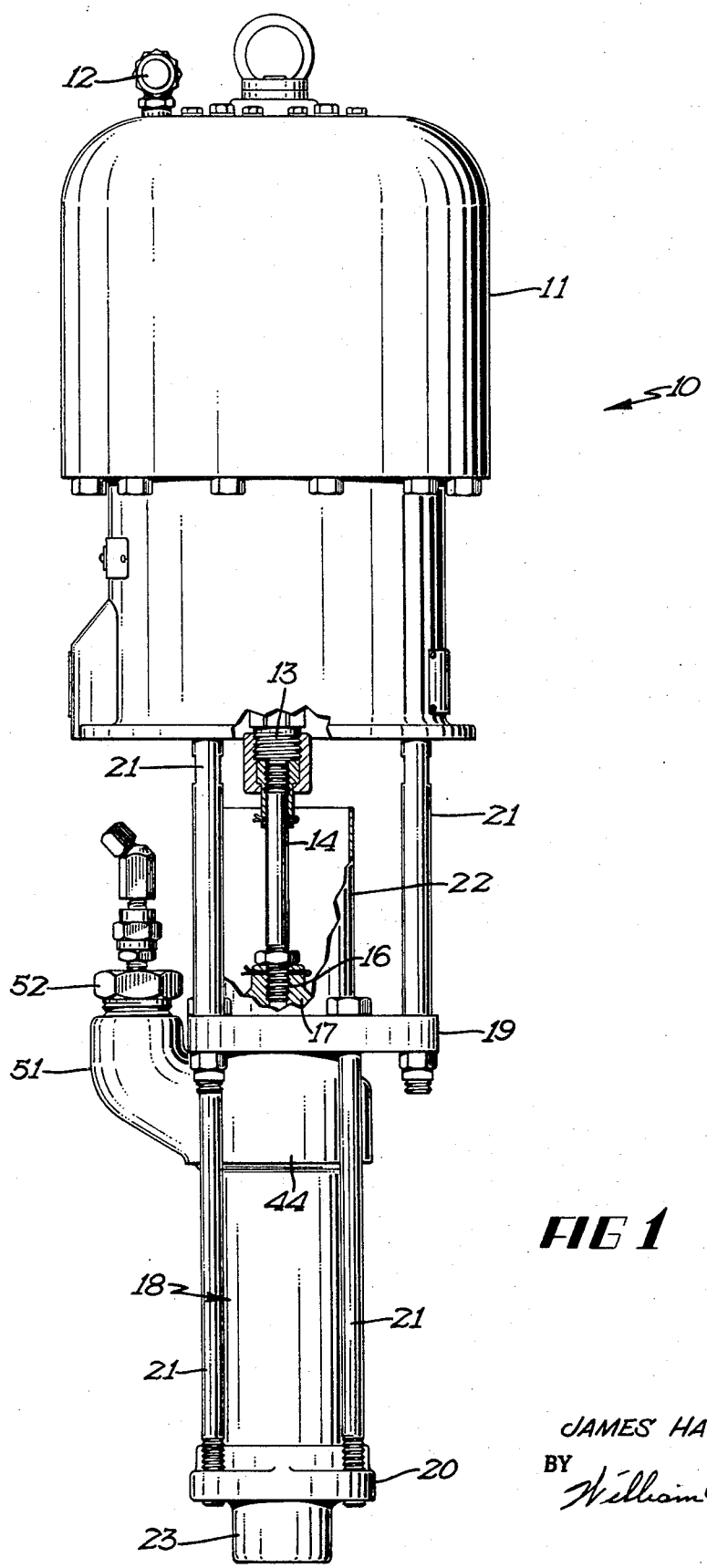
FIG. 1 is a side elevational view of a slurry pump in which the features of the present invention are included.

As shown in FIG. 1, the improved features of the present invention are incorporated in a slurry pump, i.e., a pump for slurry materials, indicated generally at 10. The pump includes a motor 11, preferably a reciprocating air-actuated motor, which may be connected at 12 to a suitably regulated source of compressed air. Motor 11 includes a vertically reciprocating power output shaft 13, connected by an intermediate shaft 14 to the upper internally threaded end 16 of a displacement rod 17.

Rod 17 reciprocates vertically within a pumping cylinder 18, secured between upper and lower cylinder supporting heads 19 and 20. Bolts 21 connect cylinder heads 19 and 20 and hold them in assembled engagement with cylinder 18 and discharge housing 44. The pump cylinder supporting head 19 is connected, in turn, to the housing of motor 11 by three spacer bolts 21 spaced circumferentially around the axis of reciprocation of shaft 14. A solvent cup 22 is positioned at the upper end of cylinder 18 and displacement rod 17 to contain solvent, in known manner, for preventing hardening of the materials to be pumped, when the pump is shut down temporarily, e.g., overnight, without complete cleaning.

As shown in FIGS. 1 and 2, the lower supporting head 20 of the pump, which is adapted for immersion downwardly into a tank or container of slurry material to be pumped or for connection to a conduit from a remote container of such material, includes a downwardly projecting extension or inlet portion 23. Head 20 supports a lower inlet valve seat member 24, threaded within head 20. An upper inlet valve seat member 26 is secured by bolts 27 to member 24. A sealing member 28 prevents leakage of the slurry material being pumped.

Extension 23 is provided with an inlet passage 29 through which material to be pumped may reach the pumping cylinder. A beveled annular valve seat 31 within inlet passage 32 of member 24, is engaged by a ball valve 33 slidably supported within the enlarged cylindrical section 34 of the inlet passage 32 between the lower valve seat 31 and upper valve stops 36 spaced around the upper end of the inlet opening 37 in member 26. Thus, the valve ball 33 can move axially up and down along the central longitudinal axis 38 of the pump, depending on the relative pressures involved. When the ball is in the lower position of FIG. 2, against seat 31, the inlet 29, 32, 37 will be effectively closed. When the ball moves upwardly, in response to a low pressure condition within the lower end of pump cylinder 18, the slurry material to be pumped may pass into the inlet 29 past the valve seat 31 into passageway 34 through which the material flows around the ball valve 33 and into the pumping chamber portion 39 at the lower end of the cylinder 18.

Within the pump cylinder 18, displacement rod 17 is vertically or longitudinally movable along the axis 38 to secure the desired pumping action. Displacement rod 17 has a hollow central body section 41 between its upper end 16 and a lower piston head and valve supporting portion 42. The displacement rod has its upper end portion projecting out through a sealing and bearing member indicated generally at 43 in a discharge housing 44 which has a shouldered recess 46 receiving the upper end 47 of the cylinder 18.

The outlet or discharge housing 44 has an annular outlet chamber 48 which communicates through outlet passage 49 with suitable outlet fitting portions 51, 52 for delivery of the pumped slurry material from the device. The pumped material flows into the annular chamber 48 through openings 53 communicating with the annular chamber portion 54 at the upper end of cylinder 18.

The desired pumping action is acheived by the combination of a suitable piston head bearing and sealing portion indicated generally at 56 on the lower end member 42 of the displacement rod 17, and an appropriate ball valve and fluid passage indicated generally at 57, at the lower end of the displacement rod head portion 42. The fluid passage 57 in the head 42 of the displacement rod is closed by a ball valve member 58 engaging an annular seat on valve seat member 59, supported within a recess 61 in an end plate 101. Ball valve 58 moves axially up and down within a cylindircal section 62 and the vertical guide portions 63 of a cup-shaped retaining member 64 seated against the inner end 66 of a cylindrical recess 67 in the end 42 of the displacement rod 17. The ball valve 58 is normally urged downward by gravity to hold the valve into closed position when the parts are stationary and not under pressure. However, when the displacement rod is removed downwardly toward the position in FIG. 2, slurry material in chamber 39 of the pumping cylinder can flow upwardly through the passage 57, between valve seat 59 and ball member 58, through openings 68 between guides 63 in member 64, into the enlarged annular bore 69 in the displacement rod. From bore 69 the material then flows through openings 71 in the rod to the annular chamber portion 54 at the upper end of the pumping cylinder 18. During this downward movement of the piston rod, the ball valve 33 will be forced downwardly against its valve seat 31 so that the inlet 29, 32, 37 is closed, and the material previously introduced into chamber 39 at the lower end of the pumping cylinder in effect moves through the passage 57 past valve 58 to the upper chamber portion 54 of the cylinder.

When the piston displacement rod changes direction and moves upwardly from its position in FIG. 1, ball valve 58 will be held against its seat 59 by increased pressure in chamber 54, which will be decreasing in volume as the sealing member 56 and piston rod slide upwardly in cylinder 18. During this upward movement, the slurry material will be forced into the annular section 48 and through the passage 49 and outlet fittings 51 and 52. During this some upward movement, the chamber portion 39 will be increasing in volume. The resulting relatively lower pressure in chamber portion 39 will draw slurry material in through the inlet 29 forcing the ball valve 33 upwardly as the material enters chamber 39. The cycle is then repeated, with ball valve 33 being forced tightly against its seat 31 in response to increased pressure in chamber 39 when the piston rod again moves downwardly.

According to one feature of the invention, a special bearing and sealing arrangement is provided at the point where the displacement rod projects out of the pumping cylinder. This bearing, indicated generally at 43, is positioned on a cylindrical inner (i.e., inwardly-facing) surface, part of which is defined by the inside surface 72 of a tubular extension of housing 44, and the rest of which is defined by a matching surface 73 in cylinder supporting head 19. Members 44 and 19 are held in interfitting assembly by bolts 21 (FIG. 1). A radially inwardly projecting flange 74 on housing 44 provided a rigid radial wall member 76 (FIG. 3), which partially closes and defines one end of an annular bearing and sealing section or space between the inner cylindrical surface 72, 73 and the outer (i.e., outwardly-facing) cylindrical surface 77 of displacement rod 17.

The other end of this annular bearing and sealing section is partially closed and defined by a rigid radial wall member 78 (FIG. 2) which is part of the supporting head 19. Thus, the parts may be readily disengaged when bolts 21 are removed so that end wall 78 may be out of the way both during initial assembly and later cleaning or replacement of the various bearing and sealing members to be descirbed.

Thus, an annular bearing and sealing section is completely defined between the inner cylindrical surface 72, 73, the outer cylindrical surface 77 of the displacement rod, and the axially spaced rigid end walls 76 and 78.

Within this annular bearing and sealing section, a plurality of annular members are located which have such shapes and dimensions as to substantially completely fill critical portions of the annular section and thus prevent the penetration of slurry materials therein. At the upper end of this section in FIGS. 2 and 3, the first such annular member is a nonmetallic main bearing member 79, which in this instance is preferably made of hard ceramic material. Next to this bearing member 79 is a slightly compressible ceramic gland or spacer 81 which supports a resilient packing member 82. Member 82 provides a liquid-tight seal against the surface 77 of piston member 17. An O-ring 83 in an annular recess in member 81 is compressed between members 79 and 81.

The next annular member is a metallic spacer 84. A radially resilient scraper member 86 is the next adjacent annular member in this section and immediately next to it on the other side, adjacent the displacement rod surface 77 is a rigid bearing or guiding portion 87 of a ceramic gland member 88. Portion 87 of gland 88 is immediately adjacent one side of the scraping edge portion 89 of scraper member 86. Metallic spacer 84 has a portion immediately adjacent the other side of scraping edge portion 89. The scraping member 86 also has an opposite edge 91 which should be normally free to flex radially as the scraping edge portion 89 maintains its resilient engagement with surface 77. For this purpose some play is needed in the space between the opposite edge 91 of scraper 86 and the other cylindrical surface 72, within and against which the various annular members are supported. Thus, the radial dimension of the scraper 86 between its edges 89 and 91 is substantially less than the radial distance between the outer and inner cylindrical surfaces of the bearing and sealing section.

According to this invention, as a means to prevent the penetration of slurry materials into this critical space, a resilient annular filler member 92 is mounted immediately adjacent the opposite edge portion 91 of the scraper. This annular filler member 92 has an axially extending annular portion 93 which is under resilient compression axially between the metallic spacer 84 and the radial wall of a supporting recess in the ceramic gland 88. In this particular embodiment, the resilient annular filler 92 also includes a radial annular portion 94 which extends alongside the scraper member 86 immediately adjacent the opposite edge 91, and which is also under axial compression between the scraper member 86 and the radial wall of the recess in ceramic gland 88. The ceramic gland has a base portion 96, as shown in FIG. 3, which extends along surface 72 between it and the resilient annular filler member 92. Thus, members 84 and 88 fit firmly on each side of scraper 86, and resilient filler member 92 prevents penetration of slurry materials into the critical space adjacent edge 91 of the scraper member 86, even if there should be some limited axial play between the parts. Radial portion 94 of member 92 may be cemented to the side of scraper 86.

An additional O-ring 97 is positioned in an annular recess in base portion 96 of the ceramic gland 88 and is compressed between members 88 and 84 to maintain a tight seal along the supporting cylindrical surface 72. Ceramic bearing member 79 has a radial wall 98 adapted to engage the rigid end wall 78 on member 19 to maintain the assembled annular members in the desired relative locations within the annular bearing and sealing section. This ceramic bearing member provides a relatively long cylindrical bearing surface 99 for engagement with the outer cylindrical surface 77 of piston rod 17.

In this assembly, ceramic bearing member 79 thus provides the primary bearing and supporting engagement which permits relative sliding movement of the rod 17. At the same time, the resilient scraper member 86 maintains its scraping edge portion 89 in tight engagement with rod surface 77 to prevent seepage of slurry material upwardly from the pumping cylinder and recess 48 to the bearing member 79. The resilient packing 82 between surface 77 and spacer 81 also serves as a resilient annular filler member and is under a certain amount of radial compression to assist in the sealing engagement and thereby prevent leakage of liquid along the rod 17. The parts 79, 83, 81, 84, 97 and 88 are also under axial compression from the tightening of bolts 21 and thus assist in maintaining all the annular members in that portion of the bearing and sealing section immediately adjacent cylindrical surface 72, 73 in relatively close engagement with each other so that there will be no radially extending spaces between these members through which slurry solids could readily penetrate. The axial compression and resilience of these members also takes up any slack and thus permits the manufacture of the various annular members with reasonable production tolerances, since even an accumulation of reasonable tolerances on each member, in the unlikely event that all tolerances are on the short side, would still leave no radially extending empty spaces between the various annular members close to surface 72, 73 for penetration of slurry material.

According to a further feature of the invention, another bearing and sealing member having many of the characteristics of the bearing 43 just described, is provided between the lower end 42 of the displacement rod 17 and the inner cylindrical surface of the pump cylinder 18. In this case, however, the various annular bearing and sealing members, and the wall members between which they are located, are positioned and supported on the end of the movable displacement rod, rather than on the inner stationary wall of the cylinder or its supporting head as in the case of bearing 43. For this purpose, two metallic end plates 101 and 102 (FIGS. 2 and 4) are secured against the lower end of displacement rod 17 by headed bolts 103 which are removably threaded or otherwise attached at 104 to the displacement rod end member 42. End plate 101, in addition to the valve seat supporting recess 61 previously described, has an outer annular flange 106 of L-shaped cross section which thus provides a radially and transversely extending end wall member 107 at one end of an annular bearing and sealing section between the cylindrical inner surface 108 of pump cylinder 18 and the cylindrical outer surface 109, 111 provided on the end 42 of the displacement rod 17. Surface 109 is located on the annular axially extending portion 112 of flange 106 of end member 101. The matching extension 111 of this cylindrical surface toward the head end of the piston is similarly provided by an axially extending flange portion 113 of an L-shaped extension on end member 102. This extension also provides a radial end wall member 114 which defines and partially closes the other axial end of the annular bearing and sealing section for bearing 56.

As in the case of bearing 43, a plurality of annular members substantially completely fill that portion of the space between these end wall members which is immediately adjacent the cylindrical surface 109, 111 on which these members are supported. One such annular member is a "graphitar" bearing member 116 which provides the main axially extending circumferential bearing surface 117 for supporting engagement of this end of the displacement rod within cylindrical inner surface 108 of pump cylinder 18. The resiliently expansible annular scraper member 118 of this embodiment is illustrated as having a plurality of metallic ring portions, which have outer scraping edges 119. This metallic scraper member 118 is under resilient compression within cylinder 18, so that the scraping edges 119 are resiliently urged radially outwardly into the desired scraping engagement with the cylinder. Thus, the function of scraper member 118 is similar to that of scraper member 86 in bearing 43, except that scraper member 118 of bearing 56 is resiliently urged outwardly against the inner cylindrical surface of the pump cylinder, while the scraping edge 89 of scraper member 86 in bearing 43 is resiliently urged inwardly into engagement with the outer cylindrical surface 77 of the displacement rod 17.

The annular space in bearing 56 between the opposite or inner edge 121 of scraper member 118 and the outer cylindrical surface 109, 111 provided on members 101 and 102, is substantially filled by a resilient annular filler member 122 which is preferably under both axial and radial compression. Thus, the penetration of slurry materials into the critical space between the scraper member 118 and the inner surface 109, 111 is effectively prevented, yet the inner or opposite edge 121 of the scraper member is permitted to have limited radial freedom of movement as needed. Bearing 56 also includes a resilient rubber bearing sleeve 123 which, in effect, is another annular member within the bearing and sealing section. This annular resilient sleeve 123 extends immediately adjacent cylindrical surface 109, 111 throughout the axial distance from wall member 107 to wall member 114. This resilient sleeve fills the space between the bearing member 116 and the surface 109, 111 in such a way as to prevent penetration of slurry material into this area. It also permits the use of reasonable manufacturing tolerances for the inner diameter of bearing member 116.

Another resilient annular filler member, in the form of an O-ring 124, is located at the upper end of bearing member 116, immediately outside of and adjacent to sleeve 123. O-ring 124 is under axial compression between the end of bearing 116 and wall member 107. It thus helps prevent penetration of slurry material into the space adjacent surface 109, 111, and also holds bearing 116 firmly against scraper 118. Thus, scraper 118 is positioned between rigid members which guide and position the scraper during its limited radial flexing engagement with surface 108. These adjacent rigid members include the annular bearing member 116 and the end wall member 114 in this bearing 56.

The relative selection, shape and location of parts in both bearings 43 and 56 make it possible, according to the invention, to manufacture these various wall members and annular members with dimensional manufacturing tolerances of a reasonable or liberal nature, rather than with the close and stringent tolerances which are ordinarily required for precision fitting of parts. In each of these bearings, the use of an annular member which is capable of at least limited resilient axial compression and which is sufficiently resiliently expansible to hold the parts in tight axial engagement with each other helps prevent the seepage of slurry material radially between any of the parts to the region immediately adjacent the cylindrical surface on which the annular bearing and sealing members are supported.

As one example of such tolerances, the various annular elements in bearing 43 (FIGS. 2 and 3) may be made with axial dimensions and tolerances as follows:

| Annular member: | Axial dimension (inches) |
| --- | --- |
| ceramic gland 88 (at 96) | 0.368±.003 |
| metallic spacer 84 | 0.135±.003 |
| ceramic gland 81 | 0.458±.003 |
| ceramic bearing 79 (portion between gland 81 and end wall 78) | 1.190±.003 |

Thus, the total tolerances for all four of these parts along the axial space between end walls 76 and 78 could be as much as .012 inch above or below the planned total dimensions of 2.151 inches for these parts. The distance between wall members 76 and 78 must be sufficient to accommodate an accidental assembly of parts all of which are on the high tolerance of axial dimensions, i.e., a total spacing of 2.163 inches. If all the parts, on the other hand, were accidentally on the short side of their dimensional tolerances, they would leave an effective total gap of .024 inch axially. Resilient O-rings 83 and 97, and resilient filler member 92, however, all provide means under axial compression to assist in either filling the critical spaces involved or sealing the parts against radial penetration of slurry material between them into the space adjacent edge 91 of scraper 86 or into the region immediately adjacent the cylindrical surface 72 on which the annular members of bearing and sealing section 43 are supported.

The construction of bearing and sealing sections 43 and 56 also reduces to a minimum any metal-to-metal engagement between the respective cylinder and piston parts. For example, the main bearing or supporting engagement in each case is provided by nonmetallic members such as the ceramic bearing 79 and the graphite bearing 116. The only real metal-to-metal engagement at these bearings is between the scraping edge portions of the respective resilient scraper members 86 and 118 and the metallic cylindrical surfaces 77 and 108 which they respectively engage. In this case, the metal-to-metal contact is desired, since the metal parts will maintain the desired scraping action to prevent build-up or plating on any metallic surface. The remaining portions of each bearing are dimensioned, with appropriate tolerances, so that they do not quite come into engagement with the opposite metallic cylindrical surface involved. Thus, end wall members 76 and 78 and metallic spacer 84 in bearing 43 do not extend radially all the way into engagement with the cylindrical outer surface 77 of the piston rod. The resilient packing 82 of bearing 43 is intended to have actual engagement with surface 77, but this is primarily for a liquid sealing effect on the atmospheric or low pressure side of the bearing. The solid slurry material within the pump cylinder is intended to be retained and scraped on the inner side of the bearing, i.e., on the lower side of the scraping edge portion 89, at all times. Thus, the slurry material is not permitted to gain access to the space between the resilient packing 82 and the cylindrical surface 77 and accordingly cannot contribute substantially to the wearing out of such packing. Such a packing 82 is omitted from bearing 56, since there is liquid slurry material both above and below that bearing, and no liquid-tight seal is needed.

The preferred piston head valve arrangement according to the invention, as shown generally at 57, is likewise designed to minimize any metal-to-metal contact between the parts. Thus, the metallic ball valve 58 is slidably supported between the axially extending portions 63 of the rubber or plastic cup-shaped member 64. The valve seat member 59 is likewise made of plastic, resilient or other nonmetallic material. To minimize the number of parts, and for convenience in assembly, the metallic end member 101 at the head end of rod 17 is provided with an annular extension 127 projecting into the bore 57 in rod end 42 far enough to engage and hold the portion 62 of cup-shaped member 64 in position. Again, the relative dimensions of these parts may be made with reasonable tolerances and a resilient packing and sealing ring 128 between the extension 127 and the edge of portion 62 of member 64 maintains the desired sealing and tight inter-fitting engagement of these parts. An annular resilient gasket 129 provides a similar sealing function at the outer lower edge of the rod end 42 between the rod end and the metallic end member 101. A similar gasket 131 provides a seal between end plates 101 and 102.

Slurry pumps incorporating the features of the present invention as described in the foregoing specification have been found to operate extremely satisfactorily with slurry materials of substantial solids content which have previously been considered difficult or impossible to pump for extended periods of time without binding, seizing or undue wear of the parts. The foregoing specification accordingly describes the background and nature of the invention and some of the ways of practicing it, including those embodiments presently contemplated as the best mode of carrying out the invention.

Now, therefore, what is claimed is:

1. In a pump for fluid slurry material having two relatively movable parts, the first of which has a cylindrical inner surface portion, and the second of which has a coaxial cylindrical outer surface portion spaced within said inner surface and providing an annular cylindrical bearing and sealing section between them, said parts being relatively movable with respect to each other along the common longitudinal axis of said cylindrical surface portions, and one of said first and second parts having means providing two axially spaced end walls projecting radially toward the other part and at least partly closing and defining the axial ends of said annular bearing and sealing section, the improvement comprising: a plurality of annular members supported by the cylindrical surface on said one of said parts in the annular section between said radial end walls, one of said members being a cylindrical annular solid bearing member having a nonmetallic bearing surface for sliding engagement with the cylindrical surface portion of said other relatively movable part, another of said members being a scraper member having a radially and resiliently deformable metallic circular scraping edge portion resiliently engaging the cylindrical surface of said other part to scrape slurry material therefrom, the scraper member also having an opposite edge portion spaced radially from the scraping edge portion by a radial dimension less than the radial spacing within said annular section, the relative dimensions of the members providing a limited annular space within the annular bearing and sealing section adjacent the opposite edge portion of the scraper member, another of said members being a resilient annular filler member having a resilient expansible body portion compressed within the limited annular space immediately adjacent said opposite edge portion and thereby excluding fluid slurry material from said limited space and opposite edge portion, all of said annular members having cross sections and dimensions which combine to substantially completely fill the axial length of that portion of said annular bearing and sealing section which extends between said end walls immediately adjacent the cylindrical surface of said one of said parts, one of said annular members having a resiliently expansible portion under compression axially adjacent another of said annular members, and thereby resisting the penetration of slurry material radially between said annular members toward the cylindrical surface of said one of said parts, and the scraping edge portion of said scraper member being located between two immediately adjacent rigid elements selected from the group consisting of the remaining annular members and one of said end walls.

2. A pump according to claim 1 in which said one of said first and second parts is said first part and said other relatively movable part is said second part.

3. A pump according to claim 1 in which said non-metallic bearing surface is a ceramic surface.

4. In a pump for fluid slurry material having two relatively movable parts, the first of which has a cylindrical inner surface portion, and the second of which has a coaxial cylindrical outer surface portion spaced within said inner surface and providing an annular cylindrical bearing and sealing section between them, said parts being relatively movable with respect to each other along the common longitudinal axis of said cylindrical surface portions, and one of said first and second parts having means providing two axially spaced end walls projecting radially toward the other part and at least partly closing and defining the axial ends of said annular bearing and sealing section, the improvement comprising: a plurality of annular members supported by the cylindrical surface on said one of said parts in the annular section between said radial end walls, one of said members being a cylindrical annular solid bearing member having a nonmetallic bearing surface for sliding engagement with the cylindrical surface portion of said other relatively movable part, another of said members being a scraper member having a radially and resiliently deformable metallic circular scarping edge portion resiliently engaging the cylindrical surface of said other part to scrape slurry material therefrom, the scraper member also having an opposite edge portion spaced radially from the scraping edge portion by a radial dimension less than the radial spacing within said annular section, the relative dimensions of the members providing a limited annular space within the annular bearing and sealing section adjacent the opposite edge portion of the scraper member, another of said members being a resilient annular filler member having a resiliently expansible body portion compressed within the limited annular space immediately adjacent said opposite edge portion and thereby excluding fluid slurry material from said limited space and opposite edge portion, said limited annular space having the same axial dimension as that of the scraper member and said space extending radially from the opposite edge portion of the scraper member toward said cylindrical surface portion of said one relatively movable part, with said resilient annular filler member substantially completely filling said limited annular space, all of said annular members having cross sections and dimensions which combine to substantially completely fill the axial length of that portion of said annular bearing and sealing section which extends between said end walls immediately adjacent the cylindrical surface of said one of said parts, one of said annular members having a resiliently expansible portion under compression axially adjacent another of said annular members, and thereby resisting the penetration of slurry material radially between said annular members toward the cylindrical surface of said one of said parts, the scraper member and filler member being positioned axially adjacent one of said end walls, said bearing member being next axially adjacent said scraper member and filler member, said one annular member which has a resiliently expansible portion under compression axially adjacent another of said annular members being a resiliently expansible annular member axially compressed between said bearing member and the remaining end wall, and one of said annular members being an annular resilient bearing shield extending axially from the resilient filler member to the other end wall in said annular bearing and sealing recess between the cylindrical surface of said one relatively movable part and the other annular members.

5. A pump according to claim 4 in which said one relatively movable part is said second part and said other relatively movable part is said first part.

6. In a puump for fluid slurry material having two relatively movable parts, the first of which has a cylindrical inner surface portion, and the second of which has a coaxial cylindrical outer surface portion spaced within said inner surfaces and providing an annular cylindrical bearing and sealing section between them, said parts being relatively movable with respect to each other along the common longitudinal axis of said cylindrical surface portions, and one of said first and second parts having means providing two axially spaced end walls projecting radially toward the other part and at least partly closing and defining the axial ends of said annular bearing and sealing section, the improvement comprising: a plurality of annular members supported by the cylindrical surface on said one of said parts in the annular section between said radial end walls, one of said members being a cylindrical annular solid bearing member having a nonmetallic bearing surface for sliding engagement with the cylindrical surface portion of said other relatively movable part, another of said members being a scraper member having a radially and resiliently deformable metallic circular scraping edge portion resiliently engaging the cylindrical surface of said other part to scrape slurry material therefrom, the scraper member also having an opposite edge portion spaced radially from the scraping edge portion by a radial dimension less than the radial spacing within said annular section, the relative dimensions of the members providing a limited annular space within the annular bearing and sealing section adjacent the opposite edge portion of the scraper member, another of said members being a resilient annular filler member having a resiliently expansible body portion compressed within the limited annular space immediately adjacent said opposite edge portion and thereby excluding fluid slurry material from said limited space and opposite edge portion, said filler member having a first resiliently expansible portion axially adjacent said scraper member and a second resiliently expansible portion radially adjacent said scraper member between its opposite edge portion and said cylindrical surface portion, all of said annular members having cross sections and dimensions which combine to substantially completely fill the axial length of that portion of said annular bearing and sealing section which extends between said end walls immediately adjacent the cylindrical surface of said one of said parts, one of said annular members having a resiliently expansible portion under compression axially adjacent another of said annular members, and thereby resisting the penetration of slurry material radially between said annular members toward the cylindrical surface of said one of said parts, said bearing member being axially adjacent one of said end walls, said scraper being axially spaced from said bearing member with the first resiliently expansible portion of the filler member located on the side of the scraper member toward the other end wall, and said annular members also including a metallic spacer axially adjacent said scraper member on the side of the scraper member toward said bearing member and spaced axially from said bearing member, and an annular solid gland having a support portion extending from said other end wall to said metallic spacer between said second resiliently expansible portion of the filler member and the cylindrical surface of said one relatively movable part.

7. In a pump for fluid slurry material having two relatively movable parts, the first of which has a cylindrical inner surface portion, and the second of which has a coaxial cylindrical outer surface portion spaced within said inner surface and providing an annular cylindrical bearing and sealing section between them, said parts being relatively movable with respect to each other along the common longitudinal axis of said cylindrical surface portions, and one of said first and second parts having means providing two axially spaced, rigid end wall members projecting radially toward the other part and partly closing and defining the axial ends of said annular bearing and sealing section, the improvement comprising: a plurality of annular members supported by the cylindrical surface on said one of said parts in the annular section between said radial end wall members; one of said annular members being a scraper member having a radially and resiliently deformable metallic circular scraping edge portion resiliently engaging the cylindrical surface portion of said other relatively movable part, the scraper member also having an opposite edge portion spaced radially from the scraping edge portion by a radial dimension less than the radial spacing within said annular section, said scraper member being positioned axially between a selected pair of said annular and end wall members, each member of said selected pair having a solid, axially incompressible guide portion immediately adjacent said scraping edge portion, the relative dimensions of the members providing a limited annular space radially adjacent the opposite edge portion of the scraper member, and another of said annular members being a resilient annular filler member having a resiliently expansible body portion located axially between said two selected members and filling the limited space radially adjacent said opposite edge portion of said scraper member, thereby excluding fluid slurry material from said limited space and opposite edge portion, said one relatively movable part being a displacement rod and said means providing axially spaced end wall members defining the axial ends of said annular bearing and sealing section comprising a pair of circular plates secured to an end of said rod, said plates having radial flanges constituting the respective end wall members, said annular members providing a bearing and sealing section serving as a piston head on said rod end for sliding engagement within the first relatively movable part which constitutes a pumping cylinder.

8. A pump according to claim 7 in which one of said annular members is a bearing member having a hard, smooth bearing surface engaging the cylindrical surface portion of said other relatively movable part.

9. A pump according to claim 8 in which said bearing member is a graphite bearing member.

10. A pump according to claim 7 in which said rod has a valve passage extending axially from the end of the rod, a nonmetallic valve supporting member, and a nonmetallic valve seat member within said passage, means on one of said circular plates engaging one of said valve supporting and valve seat members and thereby retaining them in said passage, and a metallic valve member movably supported by said supporting member for movement toward and away from said valve seat member.

11. A pump according to claim 10 in which said circular plates are removably secured to said rod, and in which all of said annular members and said valve supporting, valve seat and valve members are readily removable and replaceable when said plates are removed from the rod and are held in assembled position when said plates are secured to the rod.

References Cited

UNITED STATES PATENTS

| | | | |
|---|---|---|---|
| 2,974,983 | 3/1961 | Meyer | 277—188 X |
| 3,056,985 | 10/1962 | Meyer | 277—188 X |
| 3,224,817 | 12/1965 | Miller et al. | 277—24 X |
| 3,527,507 | 9/1970 | Clark et al. | 308—36.1 |
| 3,549,154 | 12/1970 | Jones | 277—24 |
| 3,469,532 | 9/1969 | Wegmann et al. | 277—24 X |
| 3,022,685 | 2/1962 | Armacost | 308—M |
| 1,117,226 | 11/1914 | Obrecht | 308—238 |
| 3,053,596 | 9/1962 | Farmer et al. | 92—252 X |
| 3,366,425 | 1/1968 | Genz | 308—3.5 |
| 3,443,486 | 5/1969 | Lanman | 92—253 |

FOREIGN PATENTS

| | | | |
|---|---|---|---|
| 876,312 | 8/1961 | Great Britain | 277—24 |

MARTIN P. SCHWADRON, Primary Examiner

B. GROSSMAN, Assistant Examiner

U.S. Cl. X.R.

277—24